United States Patent [19]
Doddapaneni et al.

[11] Patent Number: 5,567,401
[45] Date of Patent: Oct. 22, 1996

[54] METHOD OF PRODUCING STABLE METAL OXIDES AND CHALCOGENIDES AND POWER SOURCE

[76] Inventors: Narayan Doddapaneni, 10516 Royal Birkdale, N.E.; David Ingersoll, 5824 Mimosa Pl., N.E., both of Albuquerque, N.M. 87111

[21] Appl. No.: 404,037

[22] Filed: Mar. 14, 1995

[51] Int. Cl.$^6$ ............... C01D 15/00; H01B 1/06; H01M 4/58
[52] U.S. Cl. .............. 423/179.5; 423/184; 423/202; 423/593; 423/594; 423/598; 423/606; 423/608; 423/641; 252/518; 429/218
[58] Field of Search .............. 252/518; 423/179.5, 423/184, 202, 592–594, 600, 608–610, 641; 429/218

[56] References Cited

U.S. PATENT DOCUMENTS

| | | | |
|---|---|---|---|
| 3,306,700 | 2/1967 | Neipert et al. | 423/179.5 |
| 3,933,688 | 1/1976 | Dines | 252/518 X |
| 4,704,266 | 11/1987 | Kadokura et al. | 423/179.5 X |
| 5,135,732 | 8/1992 | Barboux et al. | 423/179.5 X |
| 5,426,006 | 6/1995 | Delnick et al. | 429/218 |

*Primary Examiner*—Donald R. Valentine

[57] ABSTRACT

A method of making chemically and electrochemically stable oxides or other chalcogenides for use as cathodes for power source applications, and of making batteries comprising such materials.

18 Claims, 6 Drawing Sheets

METHOD OF PRODUCING STABLE METAL OXIDES AND CHALCOGENIDES AND POWER SOURCE

GOVERNMENT RIGHTS

The Government has rights to this invention pursuant to Contract No. DE-AC04-76DP00789 awarded by the U.S. Department of Energy.

BACKGROUND OF THE INVENTION

1. Field of the Invention (Technical Field)

The present invention relates to rechargeable alkali metal and alkali metal ion power sources and methods of making cathode materials for such cells/batteries.

2. Background Art

Rechargeable alkali metal power sources, such as lithium cells/batteries, with either liquid or solid polymer electrolytes, exhibit high cell voltages and are capable of providing high energy and power densities over a wide operating temperature range. In recent years, considerable progress has been made in improving the performance characteristics of these power sources. These systems use alkali metal anodes and transition metal oxide or chalcogenide cathodes.

The commercial applications of power sources based on metallic lithium anodes is limited due to safety concerns, particularly under abuse conditions. The presence of metallic lithium in rechargeable cells/batteries also leads to premature cell failure due to dendritic growth. Recently, in order to address these concerns, many manufacturers, most notably Sony, have replaced metallic lithium with carbons capable of undergoing reversible lithium intercalation for use as the anode material. These power sources are commonly known as lithium ion cells and/or batteries, and they generally use solid transition metal oxides and chalcogenides as the cathode materials.

Metal oxides and chalcogenides, such as cobalt oxide ($LiCoO_2$), manganese oxide ($LiMn_2O_4$), nickel oxide ($LiNiO_2$), vanadium oxide ($V_6O_{13}$), and cobalt disulfide ($CoS_2$), have been under development as cathode materials in both lithium and lithium ion cells and batteries. These materials are capable of undergoing reversible intercalation of lithium ion upon electrochemical oxidation and reduction, i.e., their charge and discharge. These oxides, when used in conjunction with carbon materials which can be reversibly intercalated with lithium, makes possible the development of a true "rocking chair" cell, in which lithium ion reversibly intercalates/deintercalates in both the anode and cathode active materials.

Rocking chair batteries exhibit improved ambient temperature performance compared to most other common rechargeable battery systems, such as Ni/Cd, Pb/acid, and alkaline batteries. However, when these systems are stored and/or operated at higher temperatures their performance deteriorates. One of the reasons for this degradation of performance appears to be the instability of the transition metal oxide/chalcogenide cathode materials. Evaluation of published data show that metal oxides in general deteriorate on electrochemical cycling. The extent of irreversible loss of capacity per unit weight of cathode material appears to depend on the rechargeable cycle life, operating temperature, current (i.e., the rate), and the electrolyte used. It is believed that this capacity loss is caused by the structural changes taking place in the crystal structure of the metal oxides during repeated charge/discharge cycling. The newly formed oxide(s) appears to be electrochemically inactive. Consequently, the successful development of these lithium ion power sources for both consumer and electric vehicle applications depends to a large extent on the synthesis of stable metal oxides and chalcogenide materials.

In addition, the performance characteristics of the cell/battery, e.g., cycle life, rate capability, energy density, etc., are dictated, for the most part, by the intended application for the cell/battery. For example, a pacemaker is a low rate device requiring very high reliability, while a cell/battery for automotive applications is a higher rate device requiring somewhat less reliability. These performance characteristics are influenced by the morphological characteristics, such as particle size and surface area, of the active materials. In general, the desired particle size and surface area of the cathode materials is obtained after preparation of the material using mechanical means. Hence, the development of lithium and lithium ion power sources for various applications depends, to some extent, on the ability to prepare materials having the appropriate morphology.

Furthermore, in lithium cells/batteries, and/or in lithium ion cells where there is the possibility of depositing metallic lithium, safety of the system is of concern primarily due to the high reactivity of metallic lithium. In the event of cell shorting, the heat generated as a result of the rapid oxidation/reduction reaction exacerbates the condition, leading to a possible runaway reaction and violent cell decomposition. These safety concerns must be adequately addressed.

The present application discloses a method of making such stable materials of the desired morphological characteristics, as well as materials that incorporate improved overall safety features of a cell/battery.

SUMMARY OF THE INVENTION (DISCLOSURE OF THE INVENTION)

The present invention is of a method of producing chemically and electrochemically stable oxides or other chalcogenides for use as cathodes for power source applications (and power sources comprising such cathodes) comprising: mixing a lithium salt, a metal salt, a pore former, and a solvent; removing the solvent; drying the mixture; performing a stepwise heating of the mixture; and cooling the mixture in a dry atmosphere. Preferably, the lithium salt is lithium nitrate, the metal salt (or plurality of metal salts, such as nickel, cobalt, vanadium, titanium, or molybdenum salts) is a nitrate, the pore former is ammonium nitrate, ammonium bicarbonate, ammonium carbonate, or urea, and the solvent is water. Preferably, the drying occurs at approximately 125° C., the heating occurs over a period of approximately four hours (such as for approximately two hours at approximately 250° C., for approximately one hour at approximately 350° C., and for approximately one hour at approximately 480° C.) up to a maximum temperature of 800° C. or less. Removing the solvent may occur by evaporation. The mixing may occur by: dissolving the metal salt in water to form a solution; adding the solution to a solution of lithium hydroxide to form a third solution; washing the resulting precipitate; dissolving alkali metal hydroxide and a pore former in a solvent to form a fourth solution; and adding the fourth solution to the precipitate. The stepwise heating may involve heating the mixture to approximately 480° C. over approximately two hours and maintaining the temperature at approximately 480° C. for approximately three hours in an oxygen atmosphere. To improve safety, the mixing step may include mixing in an aluminum oxide, or the aluminum oxide may be used to dope the mixture at a later point.

A primary object of thee present invention is to prepare chemically stable oxides and chalcogenides for cathodes for battery applications.

Another object of the present invention is to prepare electrochemically stable oxides and chalcogenides for cathodes for battery applications.

An additional object of the present invention is to describe a procedure that can be used to prepare oxides and chalcogenides of tailored/designed morphological characteristics.

A further object of the present invention is to prepare oxides and chalcogenides exhibiting improved safety features of alkali metal and alkali ion cells/batteries.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
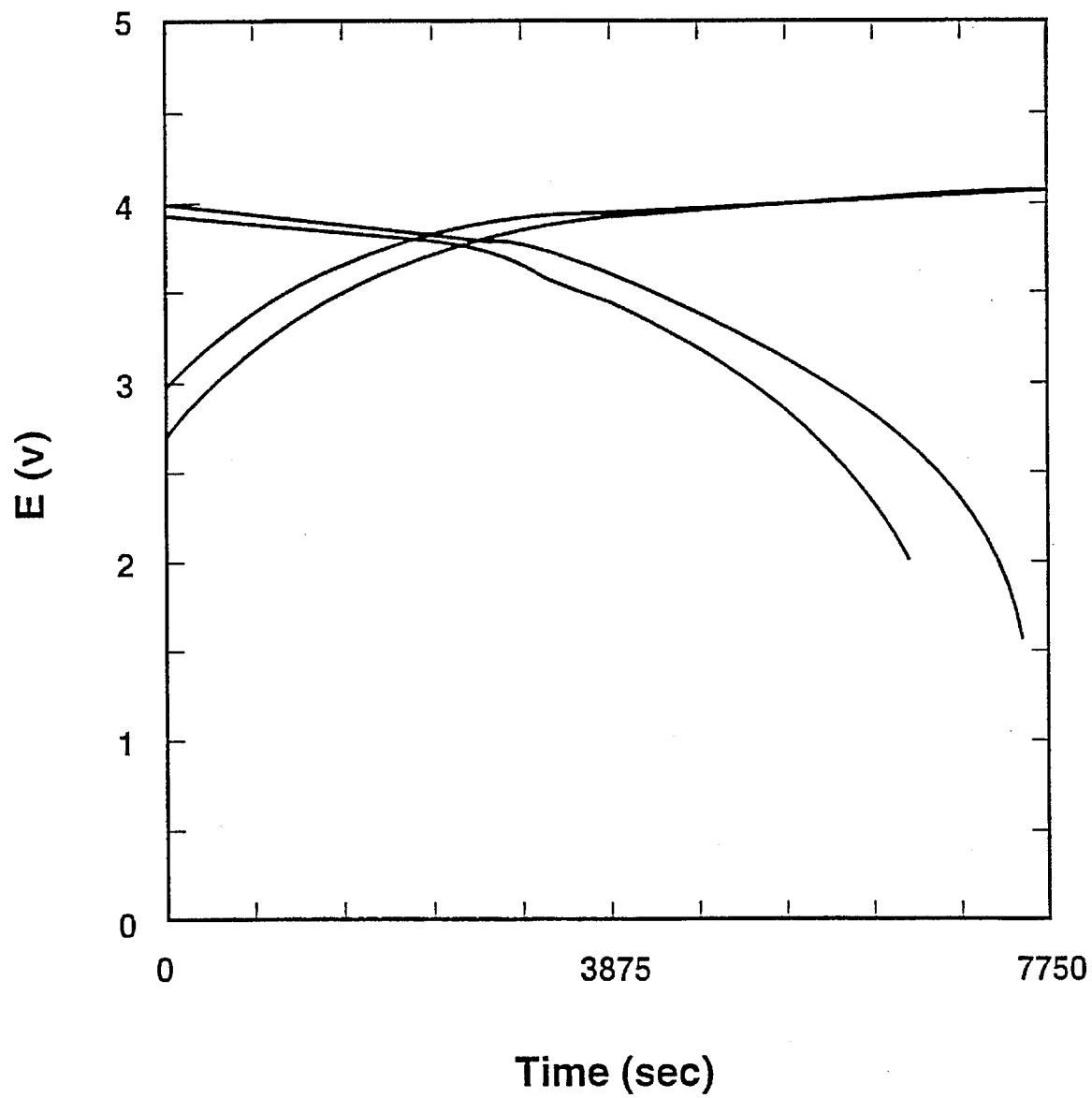
FIG. 1 is a graph of charge and discharge of a cell including $LiCo_xMn_{2-x}O_4$ (x=0.1) prepared according to the invention, at a charge and discharge rate of 2 mA/cm$^2$, at the 47th and 48th cycles (the discharge curve for the 48th cycle was recorded after sitting at open cicuit for several hours)

DESCRIPTION OF THE PREFERRED EMBODIMENT (BEST MODE FOR CARRYING OUT THE INVENTION)

The present invention is of a method of making tailored lithiated metal oxides and chalcogenides for use as cathode materials that exhibit stable performance over a prolonged cycle life of a rechargeable lithium battery that can display enhanced safety characteristics, and of making batteries comprising such materials. The invention permits preparation of stable lithiated metal oxides, chalcogenides, and mixed metal oxides and chalcogenides of the form $Li_xCoO_2$, $Li_xMn_2O_4$, $Li_xV_yO_z$, $Li_xTiS_2$, $Li_xMoS_2$, $Li_xM'_yM''_zN_w$, where M' and M" refer to two or more different metals, and N refers to oxygen, sulfur, selenium, and tellurium and w, x, y, and z are numbers between 0 and 15

The preferred method of the invention is to prepare the stable compounds by introducing or doping small amounts of foreign materials into the lattice structure of a parent compound, which imparts the desired chemical and electrochemical stability characteristics. The process also allows for control of the physical characteristics Of the resultant material. For example, the materials may be fabricated to comprise materials of variable particle sizes, including submicron sized particles having high surface area. This eliminates additional material processing steps, such as grinding, sieving, etc., which are typically needed to fabricate electrodes, particularly in all solid state systems.

To exemplify the method of the invention, synthesis of $Li_xCo_yMn_{2-y}O_4$ (x=0 to 2 and y=0.001 to 1) is described. Mix 0.9 moles of manganese nitrate, 0.1 moles of cobalt nitrate, 0.5 moles of lithium nitrate, and one mole of pore formers, such as ammonium nitrate, ammonium bicarbonate, ammonium carbonate, urea, or the like, in a suitable container. This can be done in various ways, including grinding the solid materials or by dissolution in water or other solvent. The solvent is removed, and the mixture is completely dried at 125° C., followed by the stepwise heating to a final temperature of 480° C. over a four hour period. Stepwise heating was carried out at 250° C. for 2 hours, 350° C. for 1 hour, and finally 480° C. The final temperature is then maintained for an additional four hours in an oxygen atmosphere. The heating rate to the desired temperature is 5° C. per minute. The material so obtained has a structural formula of $LiCo_{0.2}Mn_{1.8}O_4$. The final temperature, in some cases depending upon the formulation used (for example, with carbonates), may be up to 800° C. The material is then cooled in a dry atmosphere, and can be used immediately to fabricate electrodes, or stored in a dry, air tight container until required for use. The rate of heating and cooling and the amount of pore formers are the predominant controllers of the particle size and surface area of the resultant oxides. Alternatively, the transition metal nitrate salts are first dissolved in water. This solution is then quickly added to a solution of the alkali metal hydroxide. The precipitate is then washed and the requisite amount of alkali metal hydroxide (for example, potassium hydroxide) and pore former is dissolved in a minimum amount of solvent such as water. This solution is then added to the wet precipitate and thoroughly mixed. The solvent is then removed by evaporation, and the solid is then heated to 480° C. in 2 hours and kept at 480° C. for 3 hours in an oxygen atmosphere.

In order to enhance the safety of the resultant material, the metal oxides may be doped with small amounts of aluminum oxide. This ca be achieved, for example, by adding aluminum nitrate at the beginning of the synthetic procedure. Such doping also enhances the electrochemical stability of the resultant material without voltage depression of the metal oxide.

Figure 2:
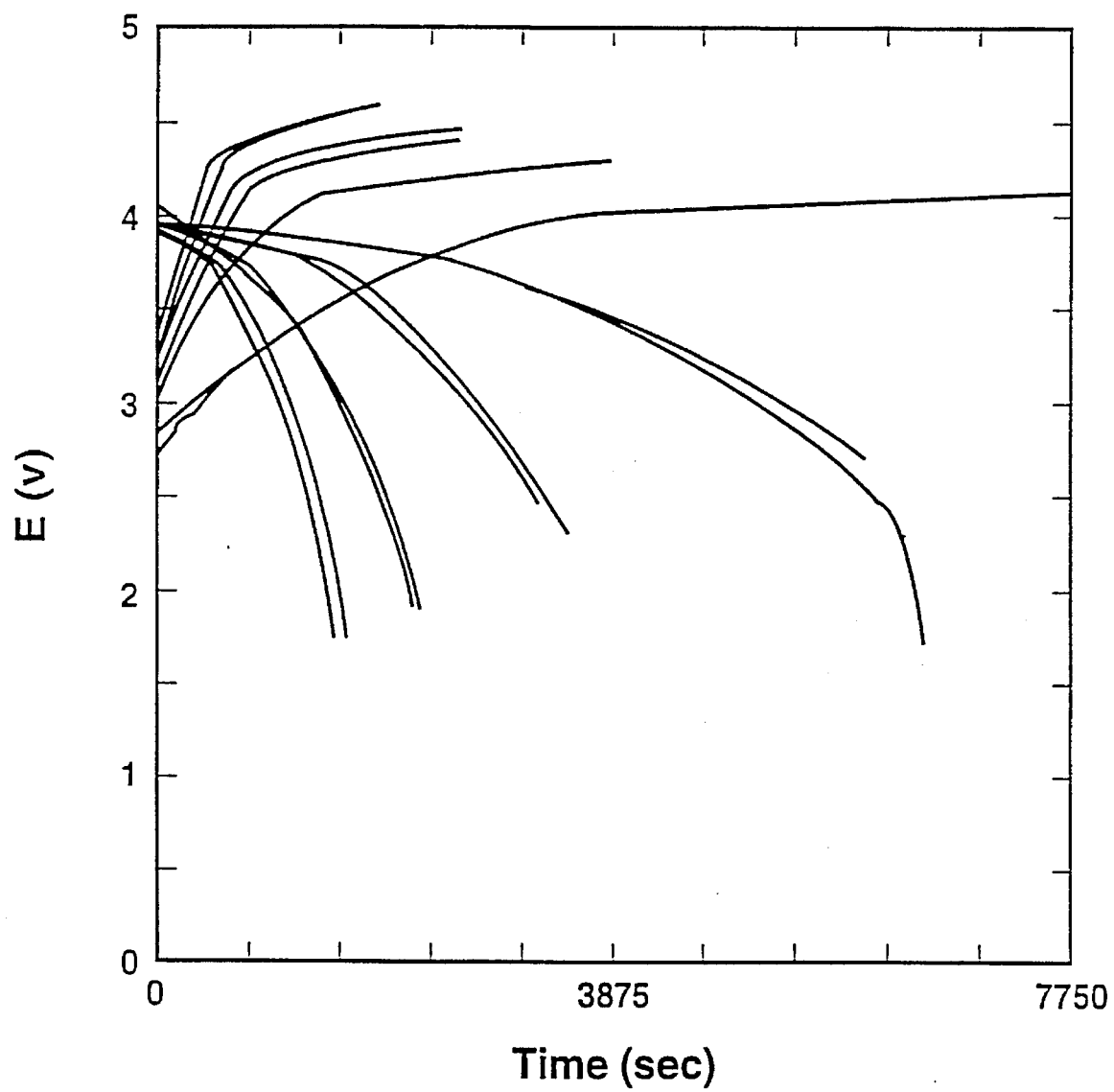
FIG. 2 is a graph of charge and discharge of a cell including $LiCo_xMn_{2-x}O_4$ (x=0.1) prepared according to the invention, at a charge and discharge rates of 2, 4, 6, and 8 mA/cm$^2$.

The material so synthesized was evaluated in electrochemical cells using liquid and solid polymer electrolytes with carbon anode. The electrochemical performance of the material showed good cycle life and rate capabilities. Referring to FIGS. 1 and 2, no loss of capacity or rate capability was observed after 48 cycles in a cell using liquid electrolytes composed of 1M $LiAsF_6$ in propylene carbonate.

Figure 3A:
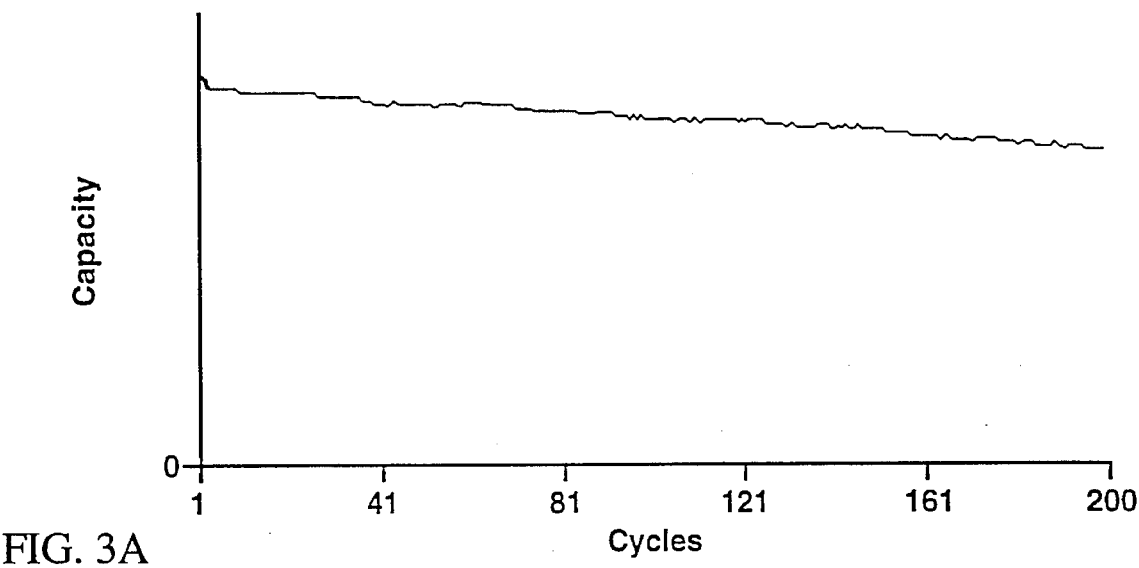
FIGS. 3A and 3B is a graph of discharge capacity and coulombic efficiency versus cycle number for $LiCo_xMn_{2-x}O_4$ (x=0.1) as a composite electrode.
Figure 3B:
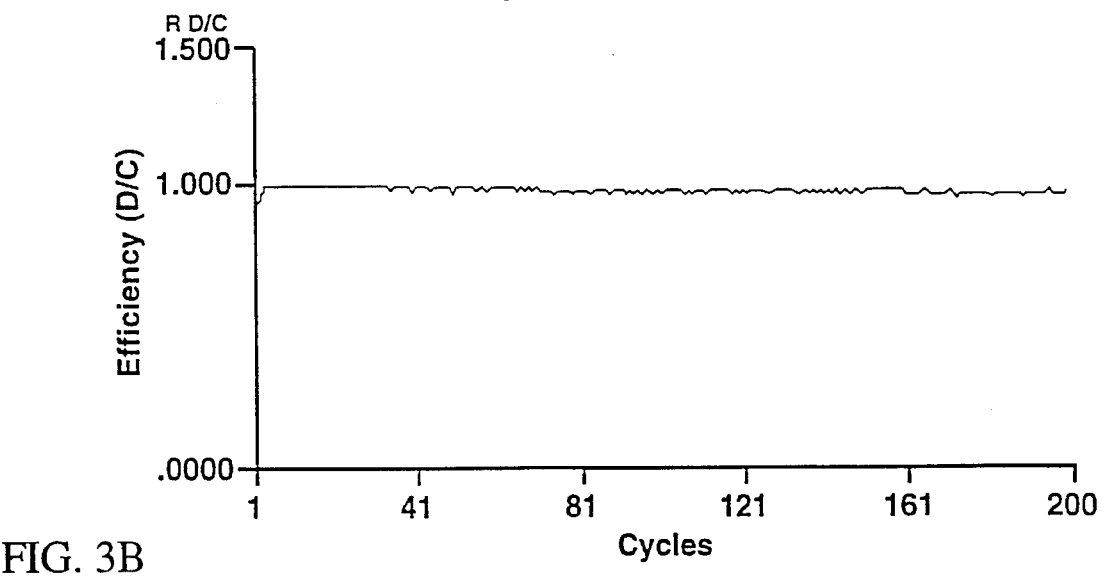
Figure 4:
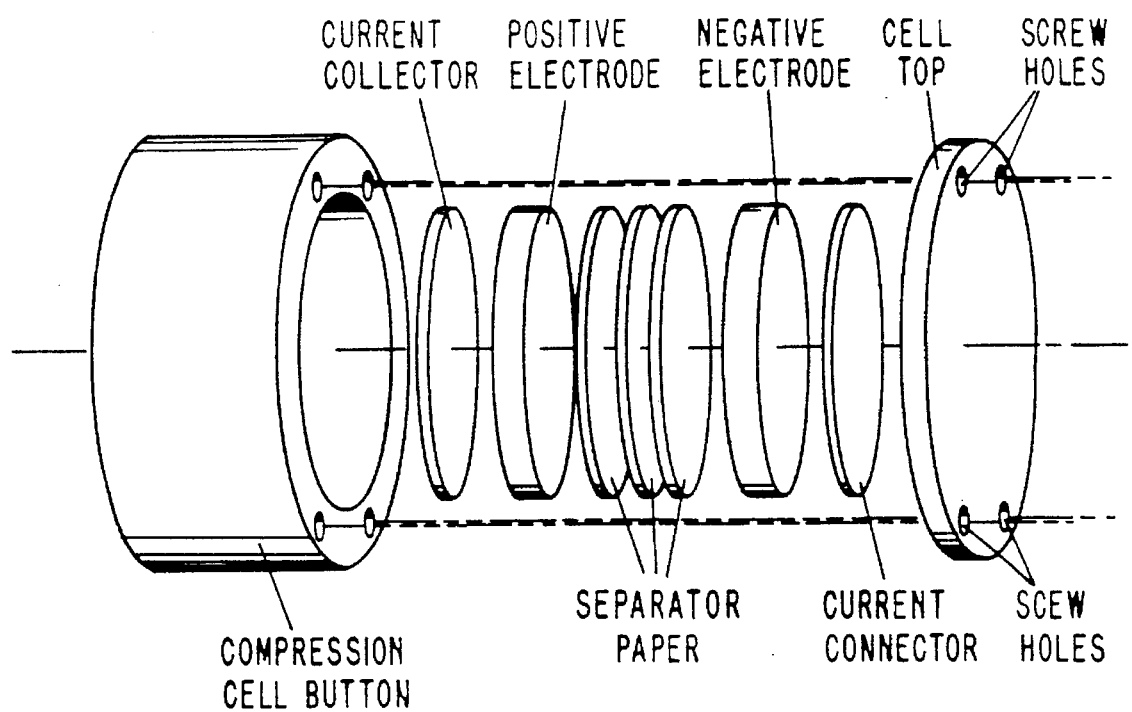
FIG. 4 is a schematic diagram of the rechargeable lithium battery of the present invention.

FIGS. 3A and 3B shows the composite electrode performance, that is the cycle life of a solid-state polymer electrolyte cell containing a $LiCo_xMn_{2-x}O_4$ (x=0.1) cathode, metallic lithium anode, and a solid polymer electrolyte. The approximate solid polymer electrolyte composition was 50% poly(vinylidene fluoride) analog, 10% $LiAsF_6$, and 20% each of propylene carbonate and diethylene carbonate.

Figure 5A:
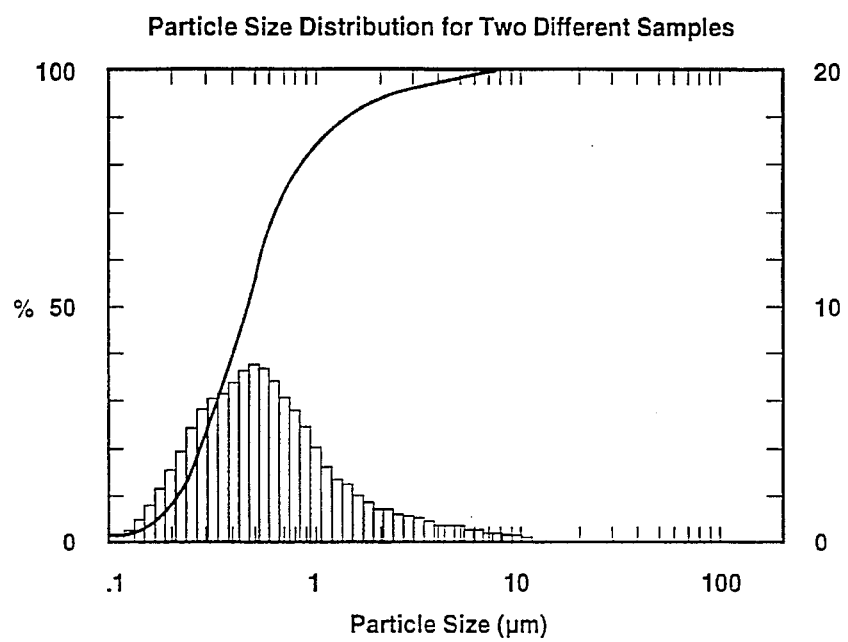
FIGS. 5A and 5B shows examples of the particle size distribution of materials that can be prepared using the method of the invention.
Figure 5B:
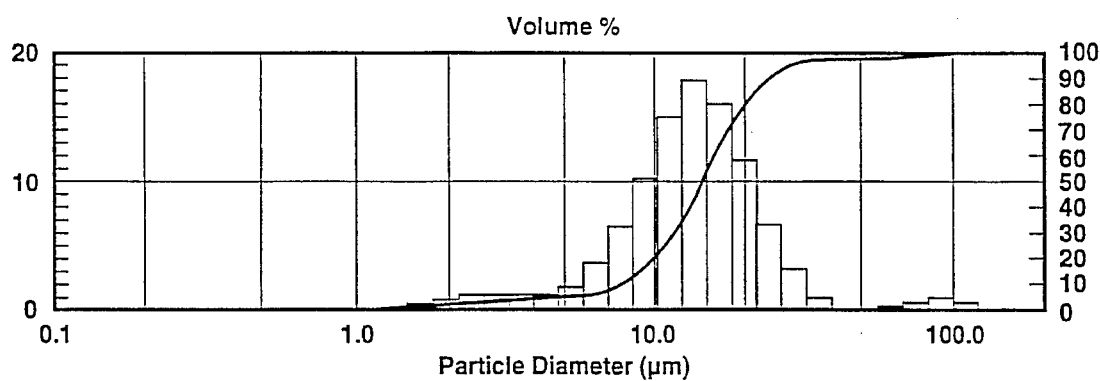

FIGS. 5A and 5B illustrates the variable particle size distribution that can be achieved using the procedure. In this case, by control of the relative amounts of materials present and the heating rate, the particle size distribution can be controlled. In many cases a monomodal can be achieved.

Figure 6A:
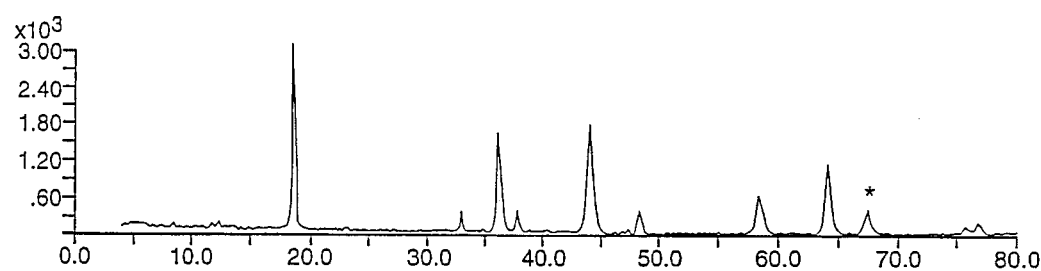
FIGS. 6A and 6B shows the X-ray diffraction pattern for a material prepared using this technique.
Figure 6B:
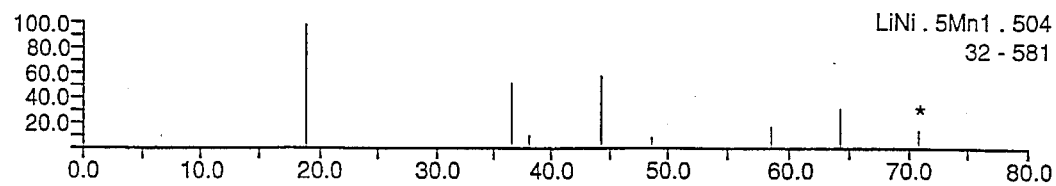

FIGS. 6A and 6B shows the X-ray diffraction pattern of $Li_{1.3}Ni_{0.2}Mn_{1.8}O_4$ which was prepared using the method of the invention.

The same process can be used to prepare other metal oxides or chalcogenides. Besides the nitrate salts, other salts may also be used. In addition, the lithium salt does not necessarily have to be present at the outset of the reaction, but can be added later in one of the subsequent synthetic steps. This can be achieved, for example, by grinding lithium hydroxide or oxide with the required amount of metal oxide or chalcogenide produced at 480° C., and then further heating the material at 480° C. for four hours. Other formulations can be used to prepare a wide variety of compositions.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of producing chemically and electrochemically stable oxides or other chalcogenides for use as cathodes for power source applications, the method comprising the steps of:
   a) mixing a lithium salt, a metal salt, a pore former, and a solvent;
   b) removing the solvent;
   c) drying the mixture;
   d) performing a stepwise heating of the mixture; and
   e) cooling the mixture in a dry atmosphere.

2. The method of claim 1 wherein the mixing step comprises mixing a lithium nitrate, a metal salt, a pore former, and a solvent.

3. The method of claim 1 wherein the mixing step comprises mixing a lithium salt, a metal nitrate, a pore former, and a solvent.

4. The method of claim 1 wherein the mixing step comprises mixing a lithium salt, a pore former, a solvent, and a metal salt selected from the group consisting of nickel salts, cobalt salts, vanadium salts, titanium salts, and molybdenum salts.

5. The method of claim 1 wherein the mixing step comprises mixing a lithium nitrate, a metal salt, a solvent, and a pore former selected from the group consisting of ammonium nitrate, ammonium bicarbonate, ammonium carbonate, and urea.

6. The method of claim 1 wherein the mixing step comprises mixing a lithium nitrate, a metal salt, a pore former, and water.

7. The method of claim 1 wherein the drying step comprises drying the mixture at approximately 125° C.

8. The method of claim 1 wherein the performing step comprises performing a stepwise heating of the mixture over a period of approximately four hours.

9. The method of claim 8 wherein the performing step comprises heating the mixture for approximately two hours at approximately 250° C., for approximately one hour at approximately 350° C., and for approximately one hour at approximately 480° C.

10. The method of claim 1 wherein the performing step comprises performing a stepwise heating of the mixture up to a maximum temperature of 800° C. or less.

11. The method of claim 1 wherein the removing step comprises removing the solvent from the mixture by evaporation.

12. The method of claim 1 wherein the mixing step comprises mixing a lithium nitrate, a plurality of metal salts, a pore former, and a solvent.

13. The method of claim 12 wherein the mixing step comprises mixing a lithium nitrate, a pore former, a solvent, and a plurality of metal salts selected from the group consisting of nickel salts, cobalt salts, vanadium salts, titanium salts, and molybdenum salts.

14. The method of claim 1 wherein the mixing step comprises the steps of:
   a) dissolving the metal salt in water to form a solution;
   b) adding the solution to a solution of alkali metal hydroxide to form a third solution;
   c) washing the resulting precipitate;
   d) dissolving lithium hydroxide and a pore former in a solvent to form a fourth solution; and
   e) adding the fourth solution to the precipitate.

15. The method of claim 14 wherein the performing step comprises the steps of heating the mixture to approximately 480° C. over approximately two hours and maintaining the temperature at approximately 480° C. for approximately three hours in an oxygen atmosphere.

16. The method of claim 1 wherein the mixing step comprises mixing a lithium salt, a metal salt, a pore former, a solvent, and an aluminum oxide.

17. The method of claim 1 additionally comprising the step of doping the mixture with an aluminum oxide.

18. A power source comprising:
   an anode; and
   a cathode comprising chemically and electrochemically stable oxides or other chalcogenides made according to the steps of:
   a) mixing a lithium salt, a metal salt, a pore former, and a solvent;
   b) removing the solvent;
   c) drying the mixture;
   d) performing a stepwise heating of the mixture; and
   e) cooling the mixture in a dry atmosphere.

* * * * *